US010890180B2

(12) United States Patent
Horie et al.

(10) Patent No.: US 10,890,180 B2
(45) Date of Patent: Jan. 12, 2021

(54) INTERNAL GEAR PUMP

(71) Applicant: SUBARU CORPORATION, Tokyo (JP)

(72) Inventors: Shinya Horie, Tokyo (JP); Katsuyuki Namiki, Tokyo (JP); Atsushi Fujie, Tokyo (JP); Makoto Saito, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 297 days.

(21) Appl. No.: 15/992,563

(22) Filed: May 30, 2018

(65) Prior Publication Data

US 2019/0032653 A1    Jan. 31, 2019

(30) Foreign Application Priority Data

Jul. 26, 2017   (JP) .................................. 2017-144650

(51) Int. Cl.
*F04C 15/00*    (2006.01)
*F04C 2/08*    (2006.01)
(Continued)

(52) U.S. Cl.
CPC .............. *F04C 2/088* (2013.01); *F04C 2/102* (2013.01); *F16H 57/0436* (2013.01); *F04C 2210/206* (2013.01); *F04C 2240/30* (2013.01)

(58) Field of Classification Search
CPC .. F04C 2/088; F04C 2/102; F04C 2/10; F04C 15/0042; F04C 15/06; F04C 15/0049; F04C 2/103
See application file for complete search history.

(56) References Cited

U.S. PATENT DOCUMENTS 2,732,802 A * 1/1956 Eames .................... F04C 15/06
                                                                418/15
2002/0054822 A1* 5/2002 Watanabe ............... F04C 2/086
                                                                418/171
(Continued)

FOREIGN PATENT DOCUMENTS

JP            2003-214356 A      7/2003
KR     10-2016-0065425           6/2016
WO         2014-034717 A1        3/2014

OTHER PUBLICATIONS

Japanese Office Action dated Feb. 5, 2019 in JP 2017-144650 (3 pages in Japanese with English translation).

*Primary Examiner* — Deming Wan
(74) *Attorney, Agent, or Firm* — Smith, Gambrell & Russell, LLP

(57) ABSTRACT

An internal gear pump includes an outer rotor, an inner rotor, and a pump housing. The inner rotor is rotatably disposed inside the outer rotor having internal teeth, forms pump chambers between the outer rotor and the inner rotor, and has external teeth. The pump housing has an inhalation port, a discharge port, and a first notch formed within a first land surface that extends from an end of the inhalation port to an end of the discharge port. The first notch is formed along a projection trajectory obtained by projecting a trajectory of chip points on the first land surface, where each chip point is a middle point between a corresponding one of the internal teeth and a corresponding one of the external teeth at a location at which the internal and external teeth substantially face each other above the first land surface and are closest to each other.

8 Claims, 10 Drawing Sheets

(51) Int. Cl.
*F04C 2/10* (2006.01)
*F04C 15/06* (2006.01)
*F16H 57/04* (2010.01)

(56) References Cited

U.S. PATENT DOCUMENTS

| | | | |
|---|---|---|---|
| 2004/0202564 A1* | 10/2004 | Ike | F04C 2/086 418/171 |
| 2011/0194968 A1* | 8/2011 | Nakagawa | F04C 15/0042 418/166 |
| 2015/0219097 A1 | 8/2015 | Torii et al. | |

* cited by examiner

INTERNAL GEAR PUMP

CROSS-REFERENCE TO RELATED APPLICATIONS

The present application claims priority from Japanese Patent Application No. 2017-144650 filed on Jul. 26, 2017, the entire contents of which are hereby incorporated by reference.

BACKGROUND

1. Technical Field

The present invention relates to an internal gear pump used for oil lubrication, and specifically, to a technical field of an internal gear pump that operates in response to a variation in volume of pump chambers that an outer rotor and an inner rotor form.

2. Related Art

Power mechanisms such as an engine and a transmission are typically lubricated with, for instance, oil for smooth movement and protection. Such a power mechanism includes an oil pump for supplying oil to components.

There are various oil pumps, one of which is an internal gear pump. The internal gear pump operates in response to a variation in volume of spaces ((pump chambers) formed in a manner in which an inner rotor having external teeth and an outer rotor having internal teeth are eccentrically arranged. Specifically, the volume of each pump chamber is increased to inhale oil with the pump chamber in communication with an inhalation circuit, and the volume of each pump chamber is decreased to discharge the oil with the pump chamber in communication with a discharge circuit.

In general, the pressure of each pump chamber is increased to the highest pressure right before the pump chamber is communicated with the discharge circuit or a discharge port. Accordingly, there are the following risks: an excessive difference between the pressure of the pump chamber and the pressure of the discharge circuit is made at the moment of the communication between the pump chamber and the discharge circuit, the flow rate of the discharged oil increases more than necessary, and a noise such as a sound of passing oil or a pump vibration is made.

To solve the above problem, Japanese Unexamined Patent Application Publication (JP-A) No. 2003-214356 discloses that a groove extending from an end of a discharge port toward an inhalation port is formed on a pump housing (casing) to inhibit the pressure from increasing and to inhibit discharge pulsation from occurring.

SUMMARY OF THE INVENTION

An aspect of the present invention provides an internal gear pump including an outer rotor, an inner rotor and a pump housing. The outer rotor has internal teeth, an inner rotor that is rotatably disposed inside the outer rotor. The outer rotor forms pump chambers configured to expand and contract repeatedly between the outer rotor and the inner rotor. The outer rotor has external teeth a number of which is one less than a number of the internal teeth. The external teeth are engageable with the internal teeth. The pump housing is formed of a case having a retention hollow in which the outer rotor is rotatably retained and a cover that blocks an opening of the retention hollow and that has an inhalation port via which a fluid is to be inhaled into the pump chambers and a discharge port via which the fluid is to be discharged from the pump chambers. The pump housing has a first notch formed within a first land surface that extends from an end of the inhalation port to an end of the discharge port, and the internal teeth and the external teeth are in sliding contact with the first land surface. The first notch is formed along a projection trajectory obtained by projecting a trajectory of chip points on the first land surface, where each chip point is a middle point between a corresponding one of the internal teeth and a corresponding one of the external teeth at a location at which the internal tooth and the external tooth substantially face each other above the first land surface and are closest to each other.

DETAILED DESCRIPTION

Figure 1:
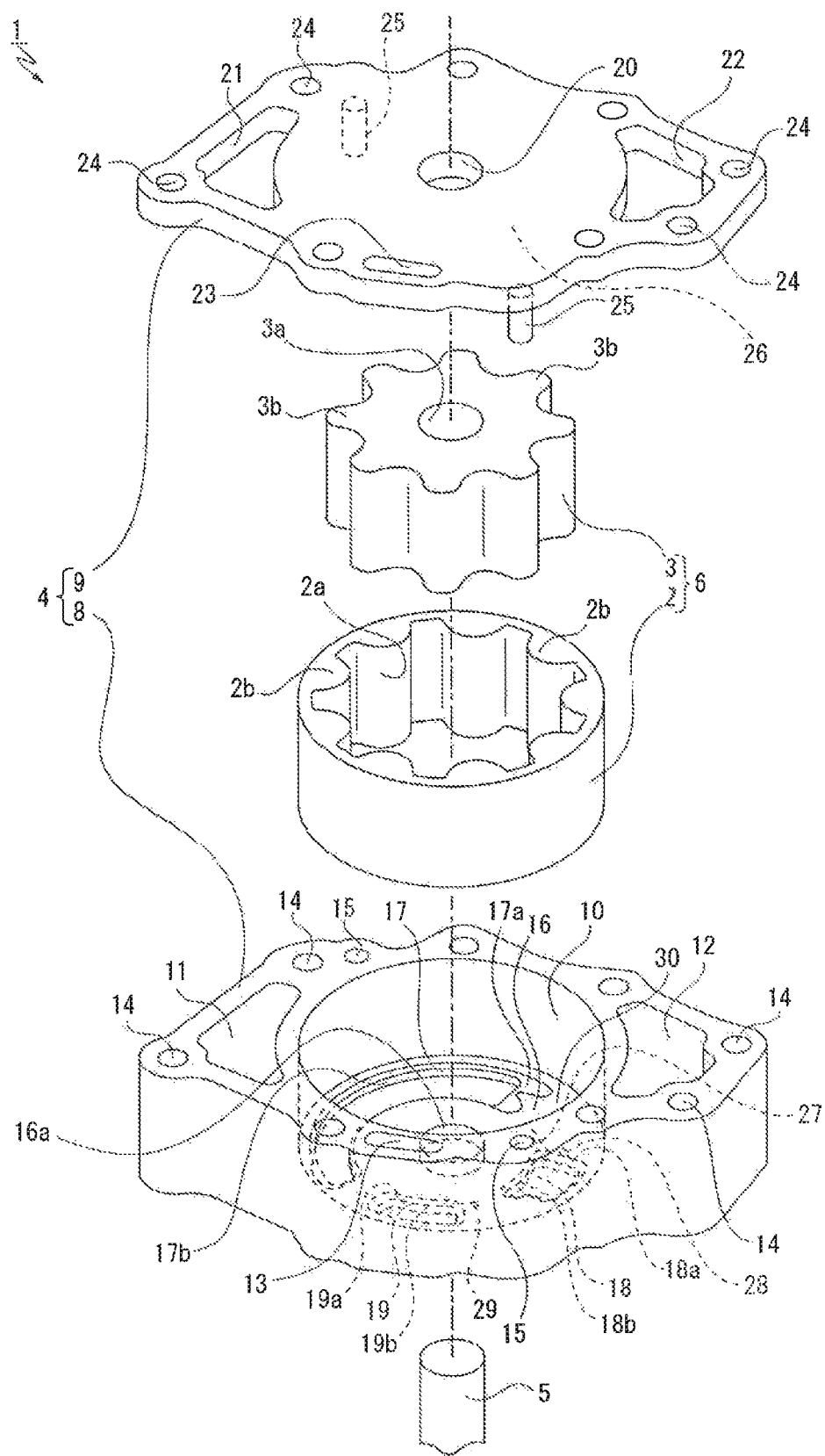
FIG. 1 is an exploded perspective view of an internal gear pump according to an example of the present invention.

An internal gear pump according to an example for carrying out the present invention will hereinafter be described with reference to the drawings. Note that sizes, materials, specific values, and any other factors illustrated in the example are illustrative for easier understanding of the present invention, and are not intended to limit the scope of the present invention unless otherwise specifically stated. Further, elements in the following example which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. Further, elements that are not directly related to the present invention are unillustrated in the drawings.

In the technology disclosed in JP-A No. 2003-214356 as the rotational speed of the inner rotor and the outer rotor increases, the difference in pressure between the discharge port and the pump chamber increases. That is, the effect of the groove formed on the pump housing that inhibits the pressure from increasing is unlikely to achieve.

It is desirable to decrease the difference in pressure between the discharge port and a corresponding one of the pump chambers even when the rotors rotate at a high speed.

1. Structure of Internal Gear Pump

The structure of the internal gear pump according to the example will be described.

In the following description, the direction of a rotation axis of the internal gear pump is a vertical direction. This direction means neither the vertical direction when the internal gear pump is used nor the vertical direction when the internal gear pump is installed, and is referred to as the vertical direction for convenience of description.

According to the example, an internal gear pump 1 is used for a power transmission mechanism (transmission) of a vehicle.

FIG. 1 is an exploded perspective view of the internal gear pump 1.

The internal gear pump 1 includes an outer rotor 2, an inner rotor 3, a pump housing 4, and a pump shaft 5 that rotates the inner rotor 3.

The outer rotor 2 has a cylindrical shape having a through-hole 2a at the center. Internal teeth 2b are formed on a surface around the through-hole 2a.

According to the example, the outer rotor 2 has nine internal teeth 2b.

The inner rotor 3 has an axial hole 3a at the center and external teeth 3b continuously formed on the outer circumferential surface in the circumferential direction, and the pump shaft 5 is inserted in the axial hole 3a. The number of the external teeth 3b of the inner rotor 3 is one less than the number of the internal teeth 2b of the outer rotor 2. According to the example, the number of the internal teeth 2b of the outer rotor 2 is nine. The number of the external teeth 3b of the inner rotor 3 is eight.

To prevent the pump shaft 5 from rotating in the axial hole 3a without making contact, a depression or a protrusion may be formed on the inner surface of the inner rotor 3 around the axial hole 3a, and a protrusion or a depression that is engaged with the depression or the protrusion may be formed on the circumferential surface of the pump shaft 5.

The inner rotor 3 is disposed in the through-hole 2a eccentrically with respect to the outer rotor 2. A combination of the outer rotor 2 and the inner rotor 3 forms a rotor unit 6.

Figure 2:
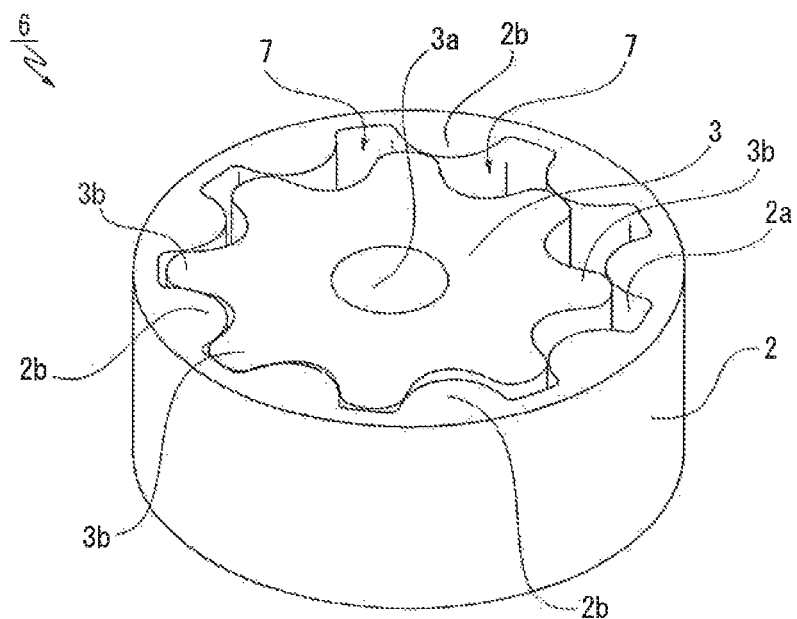
FIG. 2 is a perspective view of a rotor unit.

FIG. 2 illustrates the rotor unit 6 formed of the combination of the outer rotor 2 and the inner rotor 3. As illustrated in FIG. 2, the rotor unit 6 has pump chambers 7 between the outer rotor 2 and the inner rotor 3.

The internal teeth 2b of the outer rotor 2 and the external teeth 3b of the inner rotor 3 isolate the pump chambers 7 from each other. The pump chambers 7 are substantially separated spaces.

The pump housing 4 includes a case 8 and a cover (see FIG. 1).

The case 8 has a cylindrical retention hollow 10, a case inhalation circuit 11, a first case discharge circuit 12, and a second case discharge circuit 13, mounting holes 14, and positioning holes 15. The retention hollow 10 has substantially the same size as the rotor unit 6, and the rotor unit 6 is retained therein. A fluid is inhaled through the case inhalation circuit 11. The inhaled fluid is discharged through the first case discharge circuit 12 and the second case discharge circuit 13. The pump housing 4 is mounted on another component by using the mounting holes 14. The positioning holes 15 are formed for positioning with respect to the cover 9.

The case inhalation circuit 11, the first case discharge circuit 12, and the second case discharge circuit 13 are formed as passages through which the fluid passes.

An insertion hole 16a in which the pump shaft 5 is inserted is formed in a bottom 16 of the retention hollow 10. An inhalation port 17 via which the fluid is inhaled from the case inhalation circuit 11 into the pump chambers 7, a first discharge port 18 and a second discharge port 19 via which the fluid is discharged from the pump chambers 7 to the first case discharge circuit 12 are also formed in the bottom 16 of the retention hollow 10.

The inhalation port 17 extends along the insertion hole 16a over about a half of the circumference of the insertion hole 16a.

The first discharge port 18 and the second discharge port 19 are openings smaller than the inhalation port 17 and are formed on the substantially opposite side of the insertion hole 16a from the inhalation port 17.

The inhalation port 17, the first discharge port 18, and the second discharge port 19 are formed in this order in a rotation direction about the axis of the pump shaft 5. That is, when the rotor unit 6 rotates, the pump chambers 7 pass through above the inhalation port 17, subsequently pass through above the first discharge port 18, pass through above the second discharge port 19, and pass through above the inhalation port 17 again.

The cover 9 has an insertion hole 20, a cover inhalation circuit 21, a first cover discharge circuit 22, a second cover discharge circuit 23, mounting holes 24, and substantially columnar positioning protrusions 25. The pump shaft 5 is inserted in the insertion hole 20 that faces the insertion hole 16a when the cover 9 is combined with the case 8. The cover inhalation circuit 21 leads to the case inhalation circuit 11 of the case 8. The first cover discharge circuit 22 is led from the first case discharge circuit 12 of the case 8. The second cover discharge circuit 23 is led from the second case discharge circuit 13. The mounting holes 24 are formed to mount the pump housing 4 on another component. The positioning protrusions 25 are inserted in the positioning holes 15.

The surface of the cover 9 facing the bottom 16 of the retention hollow 10 with the cover 9 combined with the case 8 is referred to as a ceiling surface 26.

The pump chambers 7 are spaces surrounded by the inner circumferential surface of the outer rotor 2 that defines the through-hole 2a, the outer circumferential surface of the inner rotor 3, the bottom 16 of the case 8, and the ceiling surface 26 of the cover 9.

When the positioning protrusions 25 of the cover 9 are inserted in the positioning holes 15 of the case 8, the position of the cover 9 with respect to the case 8 is set. Positioning protrusions may be formed on the case 8, and positioning holes may be formed in the cover 9.

Figure 3:
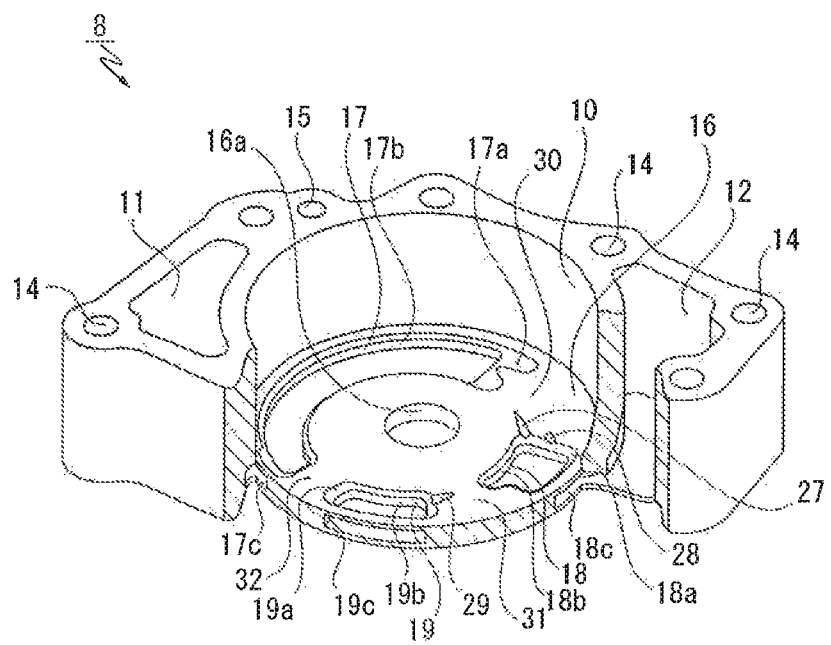
FIG. 3 is a perspective view of a section of a part of a case.

FIG. 3 illustrates a section of a part of the case 8. The inhalation port 17, the first discharge port 18, and the second discharge port 19 are illustrated in the bottom 16.

The inhalation port 17 has an inclined surface 17a formed along the outer circumference of the opening thereof and a wall 17b extending to the inclined surface 17a.

The inclined surface 17a is gently inclined downward toward the center of the inhalation port 17.

The wall 17b has a side hole 17c that opens sideways. The side hole 17c is in communication with the case inhalation circuit 11. That is, the fluid that has passed through the case inhalation circuit 11 moves to the inhalation port 17 via the side hole 17c and is inhaled to each pump chamber 7 in response to an increase in the volume of the pump chamber 7.

The first discharge port 18 has an inclined surface 18a formed along the outer circumference of the opening thereof and a wall 18b extending to the inclined surface 18a.

The inclined surface 18a is gently inclined downward toward the center of the first discharge port 18.

The wall 18b of the first discharge port 18 has a side hole 18c that opens sideways. As illustrated in FIG. 3, the first discharge port 18 is in communication with the first case discharge circuit 12 via the side hole 18c. That is, the fluid that is discharged via the first discharge port 18 passes through the side hole 18c and the first case discharge circuit 12 and is supplied to components.

The movement of the fluid in the course of inhalation and discharge will be described.

In the course of inhalation, the fluid that is stored in, for instance, an oil pan passes through the cover inhalation circuit 21 and the case inhalation circuit 11 and subsequently moves from the inhalation port 17 to the pump chambers 7.

In the course of discharge, the fluid that is discharged from the pump chambers to the first discharge port 18 passes through the first case discharge circuit 12 and the first cover discharge circuit 22.

At the same time, in the course of discharge, the fluid that is discharged from the pump chambers 7 to the second discharge port 19 passes through the second case discharge circuit 13 and the second cover discharge circuit 23. That is, the fluid is supplied to the target components via either one of the two discharge circuits.

A circuit that is led from the first discharge port 18 and a circuit that is led from the second discharge port 19 may be merged into each other by using a control valve, not illustrated. Another circuit that leads to each target component may be formed. Whether the circuits merge into each other may be switched by using the control valve.

The bottom 16 has two grooves corresponding to a first notch and a second notch that extend toward the first discharge port 13 in the circumferential direction of the bottom 16.

According to the example, the second notch is formed on the inner circumferential side of the rotor unit 6, and the first notch is formed on the outer circumferential side thereof. For this reason, the second notch is referred to as an inner circumferential notch 27, and the first notch is referred to as an outer circumferential notch 28 in the following description.

The inner circumferential notch 27 and the outer circumferential notch 28 each have a function of letting a part of the fluid in each pump chamber 7 in the initial stage of the course of compression to escape to the first discharge port 18. The detail will be described later.

The second discharge port 19 has an inclined surface 19a formed along the outer circumference of the opening thereof and a wall 19b extending to the inclined surface 19a.

The inclined surface 19a is gently inclined downward toward the center of the second discharge port 19.

The wall 19b has a side hole 19c that opens sideways. As illustrated, the fluid that is discharged via the second discharge port 19 passes through the side hole 19c and the second case discharge circuit 13 and is supplied to each component.

The bottom 16 has a groove corresponding to a third notch 29 that extends toward the second discharge port 19 in the circumferential direction of the bottom 16.

The third notch 29 has a function of letting a part of the fluid to escape early to the second discharge port 19 from each pump chamber 7 that is in the course of compression again after the fluid is discharged via the first discharge port 18.

A part of the bottom 16 between the inhalation port 17 and the first discharge port 18 is referred to as an upstream land surface 30. A part of the bottom 16 between the first discharge port 18 and the second discharge port 19 is referred to as an intermediate land surface 31. A part of the bottom 16 between the second discharge port 19 and the inhalation port 17 is referred to as a downstream land surface 32.

The inner circumferential notch 27 and the outer circumferential notch 28 are formed within the upstream land surface 30. The third notch 29 is formed within the intermediate land surface 31.

The terms such as the bottom 16 and the ceiling surface 26 are defined for convenience of description as described above and indicate neither the vertical direction when the internal gear pump 1 is used nor the vertical direct ion when the internal gear pump 1 is installed.

For instance, when the internal gear pump 1 is used, the ceiling surface 26 may face upward or may face sideways. In other words, when the internal gear pump 1 is used, the case 8 may be located above the cover 9, or the retention hollow 10 of the case 8 may open sideways.

2. Operation of Internal Gear Pump

The operation of the internal gear pump 1 according to the example will be described with reference to FIG. 4 to FIG. 14.

Figure 4:
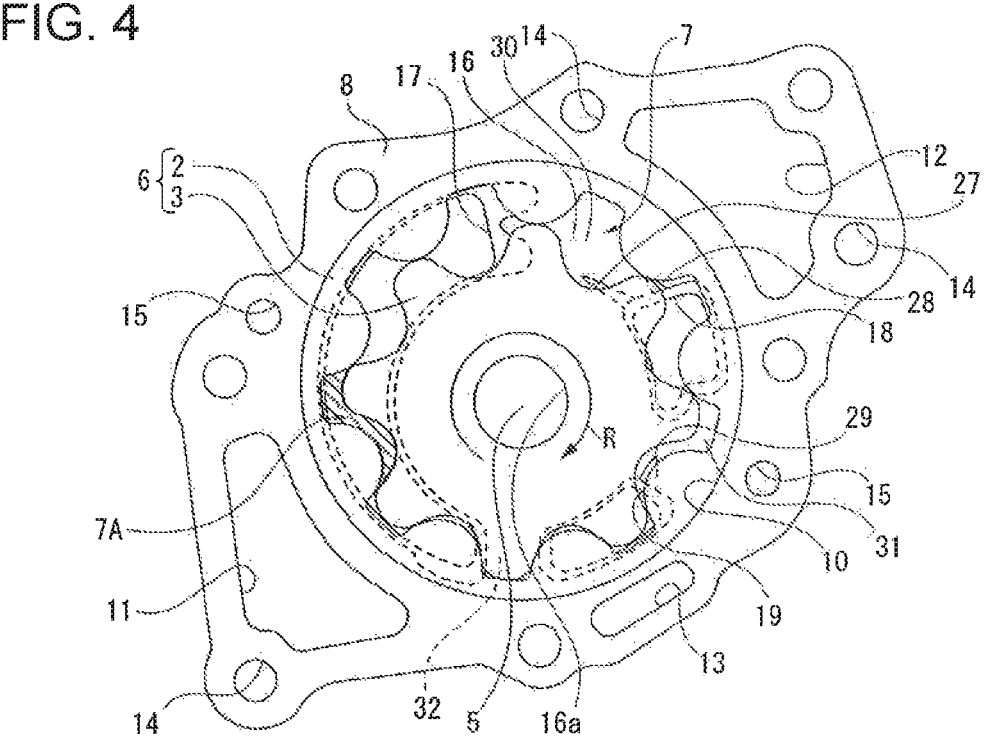
FIG. 4 is a plan view of the rotor unit disposed in the case.

FIG. 4 illustrates the outer rotor 2, the inner rotor 3, the pump shaft 5, and the case 8 viewed from the opening of the retention hollow 10.

As illustrated, the pump chambers 7 are formed between the outer rotor 2 and the inner rotor 3.

When the pump shaft 5 rotates in a rotation direction R, the inner rotor 3 rotates in the same direction. When the inner rotor 3 rotates, a rotational force is applied to the outer rotor 2 because the internal teeth 2b and the external teeth 3b are partially engaged with each other, and the outer rotor 2 also rotates in the same direction.

In response to the rotation of the pump shaft 5, the inner rotor 3, and the outer rotor 2, the pump chambers 7 move along the inner circumferential edge of the outer rotor 2 while repeatedly expanding and contracting. At this time, the pump chambers 7 are appropriately communicated with the inhalation port 17, the first discharge port 18, and the second discharge port 19 of the case 8, and the pump operates in this way.

Specifically, attention is paid to a pump chamber 7A of the pump chambers 7 to describe the state of expansion and contraction of each pump chamber 7 (see FIG. 4 to FIG. 15).

In FIG. 4 to FIG. 15, the pump chamber 7A, to which attention is paid, is illustrated by diagonal lines.

Figure 5:
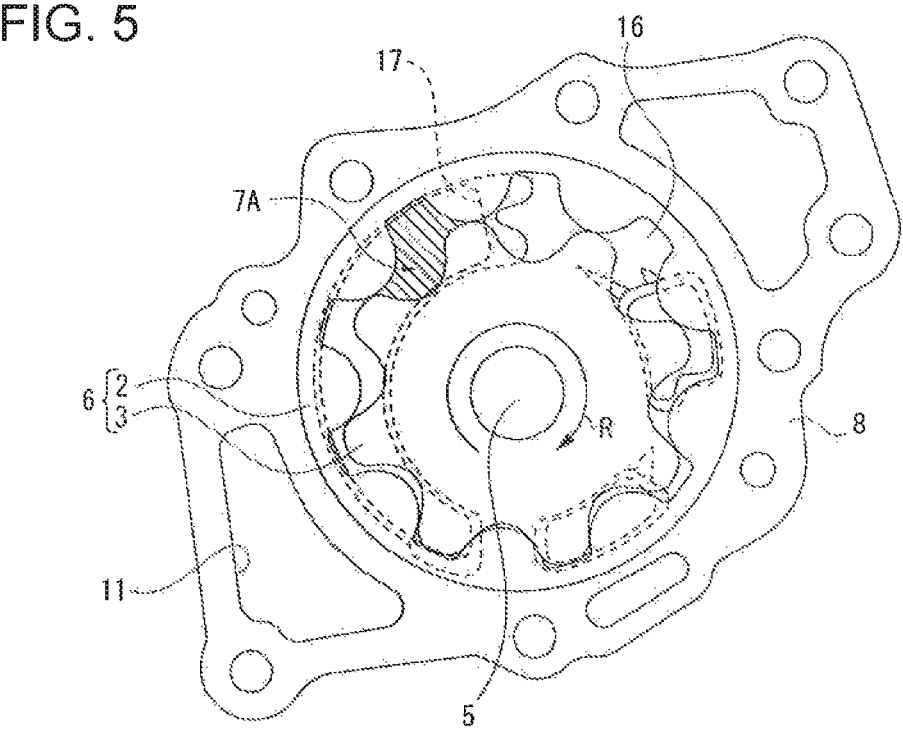
FIG. 5 is a plan view of one of pump chambers to which attention is paid and illustrates the pump chamber that moves.

FIG. 4 illustrates a state where the volume of the pump chamber 7A that is decreased to the minimum gradually increases, the pump chamber 7A moves and is communicated with the inhalation port 17, and a small amount of the fluid is inhaled into the pump chamber 7A. FIG. 5 illustrates a state where the pump shaft 5 further rotates, and the pump chamber 7A moves from the above state.

In FIG. 5 to FIG. 15, reference numbers that are necessary for the description are illustrated, and the other reference numbers are omitted in some cases.

Figure 6:
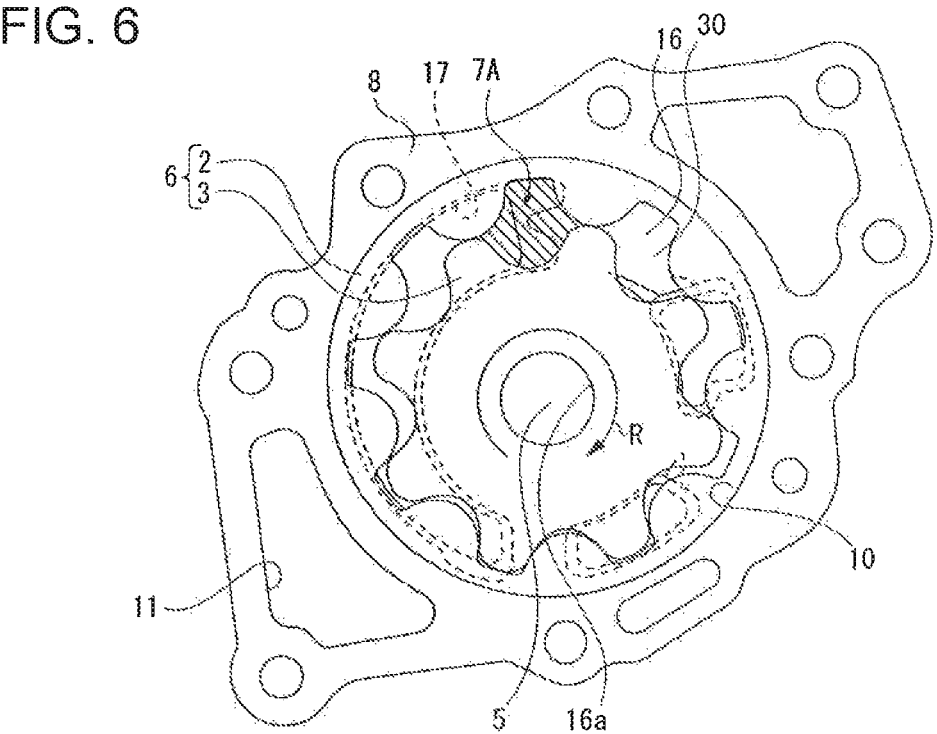
FIG. 6 is a plan view of the pump chamber to which attention is paid and illustrates the pump chamber that moves.

FIG. 6 illustrates a state right before the end of the course of inhalation. As illustrated, a part of the pump chamber 7A is located above the upstream land surface, and accordingly, the communication between the inhalation port 17 and the pump chamber 7A is about to break.

Figure 7:
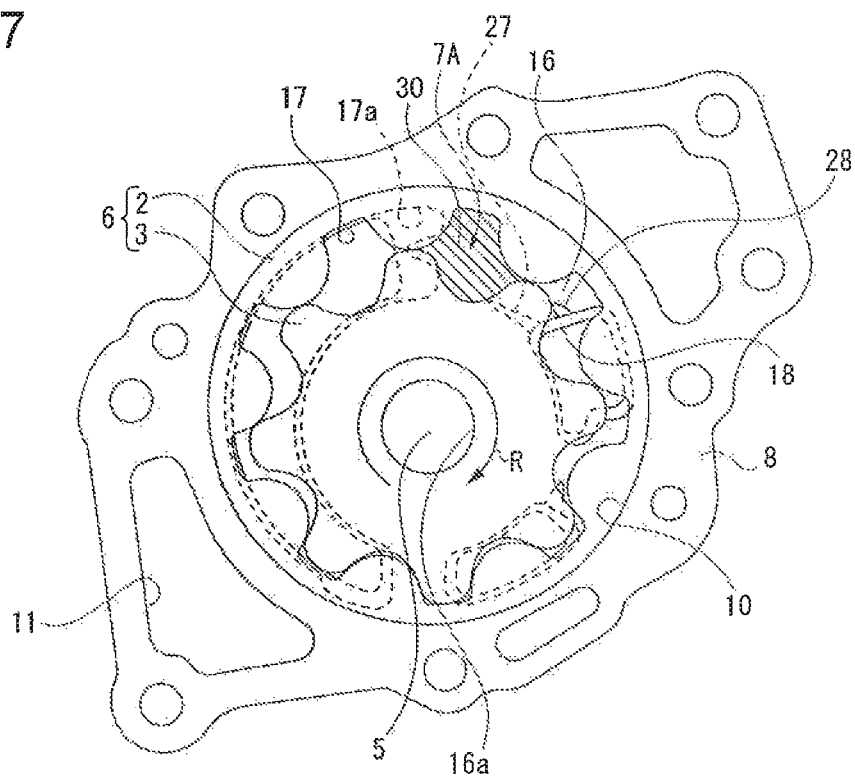
FIG. 7 is a plan view of the pump chamber to which attention is paid and illustrates the pump chamber that moves.

FIG. 7 illustrates a state where the pump shaft 5 further rotates from the state in FIG. 6, and the communication between the pump chamber 7A and the inhalation port 17 has broken.

As illustrated, the pump chamber 7A is not in communication with the inhalation port 17 (particularly, the inclined surface 17a), and the course of inhalation has been completed. In addition, the pump chamber 7A is not in communication with the first discharge port 18 (particularly, the inclined surface 18a, the inner circumferential notch 27, and the outer circumferential notch 28), and the course of discharge has not been started.

That is, in the state illustrated in FIG. 7, the pump chamber 7A is substantially sealed. The volume of the pump chamber 7A illustrated in FIG. 7 is slightly decreased from the maximum. When the pump shaft 5 rotates from the state illustrated in FIG. 7, the volume of the pump chamber 7A is further decreased, and the fluid in the pump chamber 7A is compressed.

Figure 8:
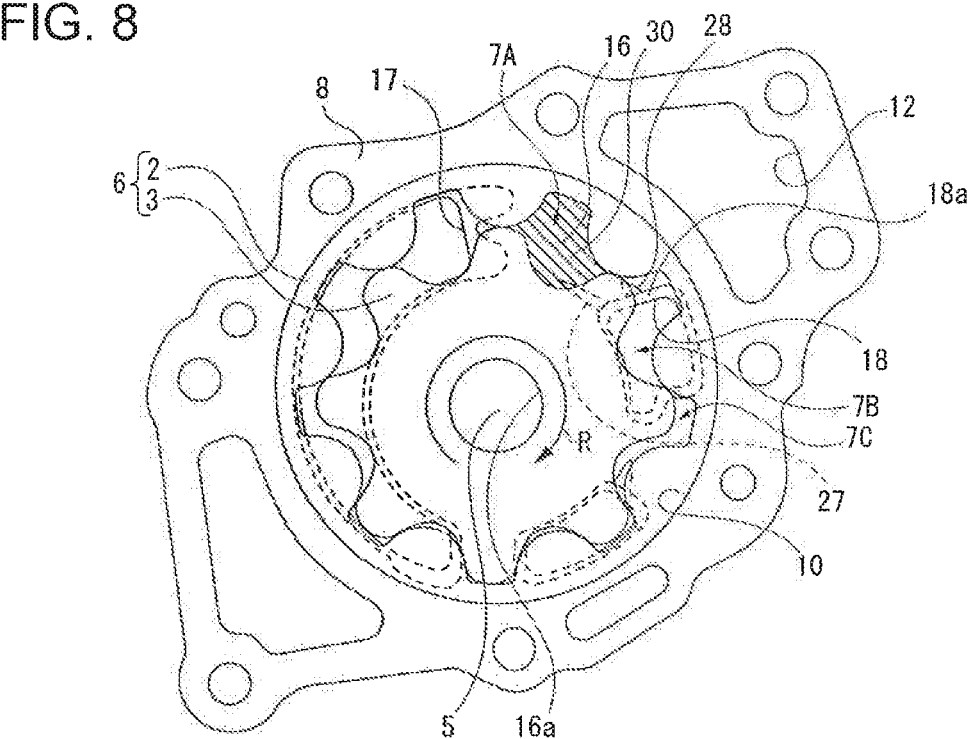
FIG. 8 is a plan view of the pump chamber to which attention is paid and illustrates the pump chamber that moves.

FIG. 8 illustrates a state where the pump shaft 5 further rotates. The pump chamber 7A is in communication with the first discharge port 18 via the inner circumferential notch 27. That is, the fluid in the pump chamber 7A passes through the inner circumferential notch 27 and is discharged via the first discharge port 18. Thus, the pressure of the inside of the pump chamber 7A is inhibited from excessively increasing.

As the pressure of the inside of the pump chamber 7A increases, the torque required for rotating the rotor unit 6 increases, and a pumping loss increases. Accordingly, the inhibition of an excessive increase in the pressure of the pump chamber 7A enables the pumping loss to be decreased and enables a fuel consumption to be improved.

Figure 9:
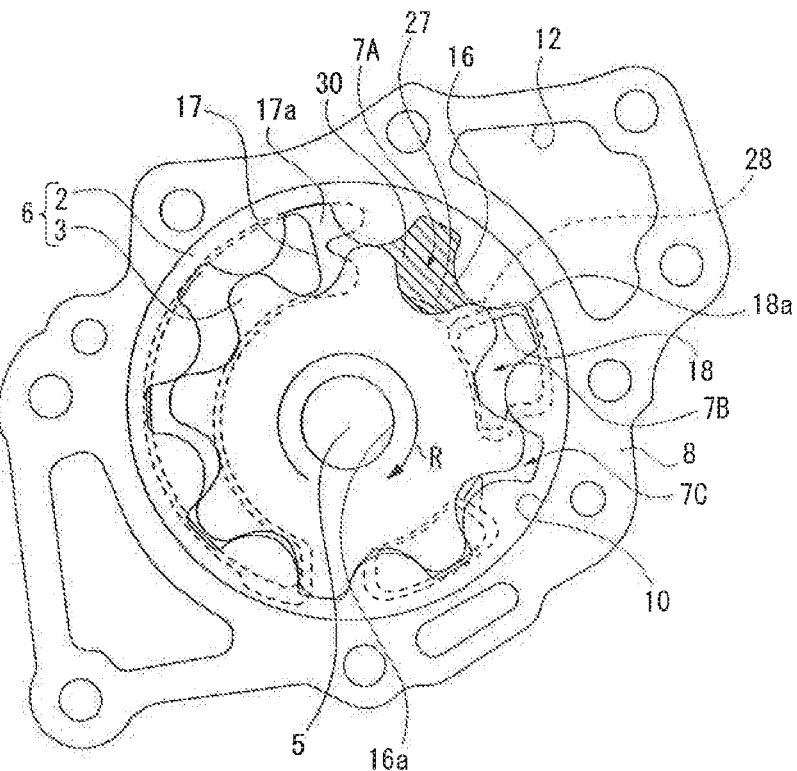
FIG. 9 is a plan view of the pump chamber to which attention is paid and illustrates the pump chamber that moves.

FIG. 9 illustrates a state where the pump chamber 7A further moves and is in communication with the first discharge port 18 via the inner circumferential notch 27 and the outer circumferential notch 28.

In this state, the fluid in the pump chamber 7A is further discharged via the first discharge port 18, and the pressure of the inside of the pump chamber 7A is inhibited from increasing.

Figure 10A:
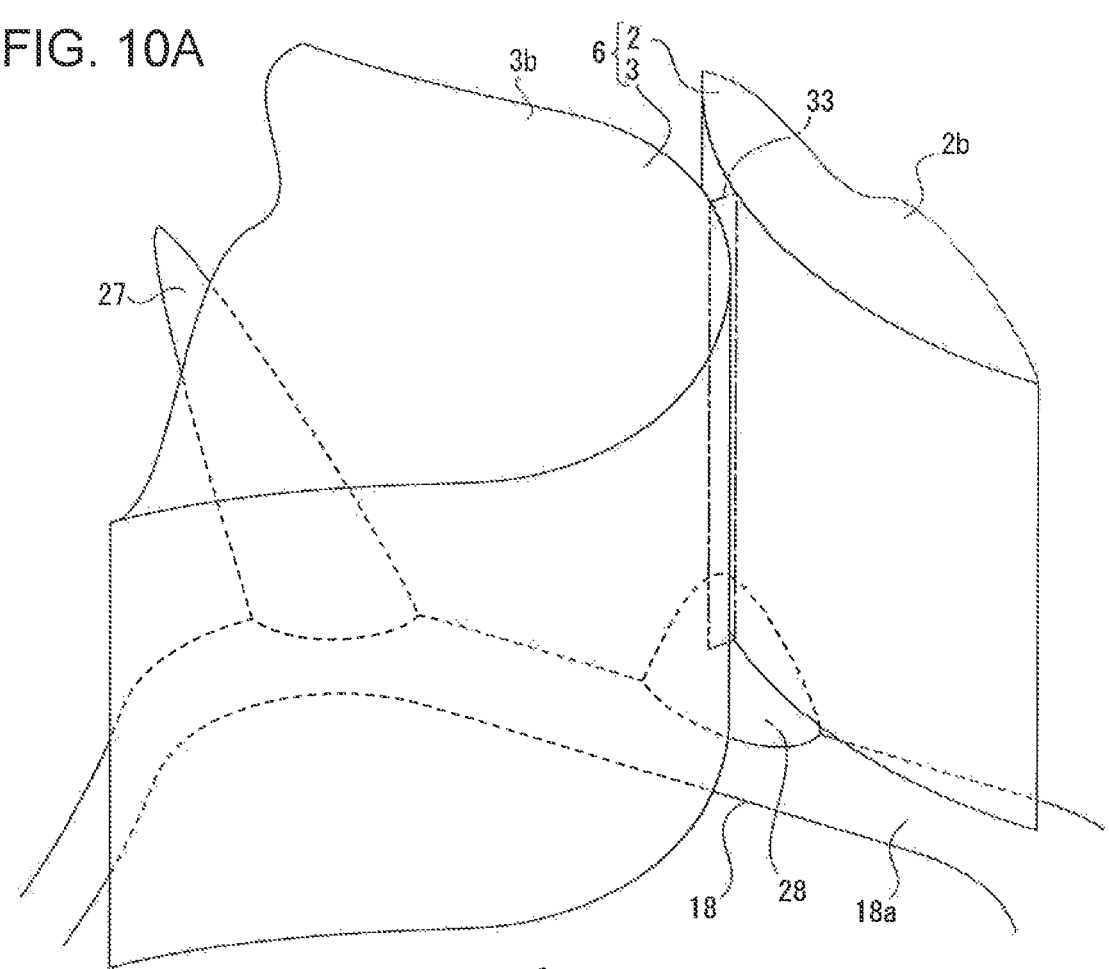
FIGS. 10A and 10B illustrate the positional relationship among a space, a chip point, and an outer circumferential notch.
Figure 10B:
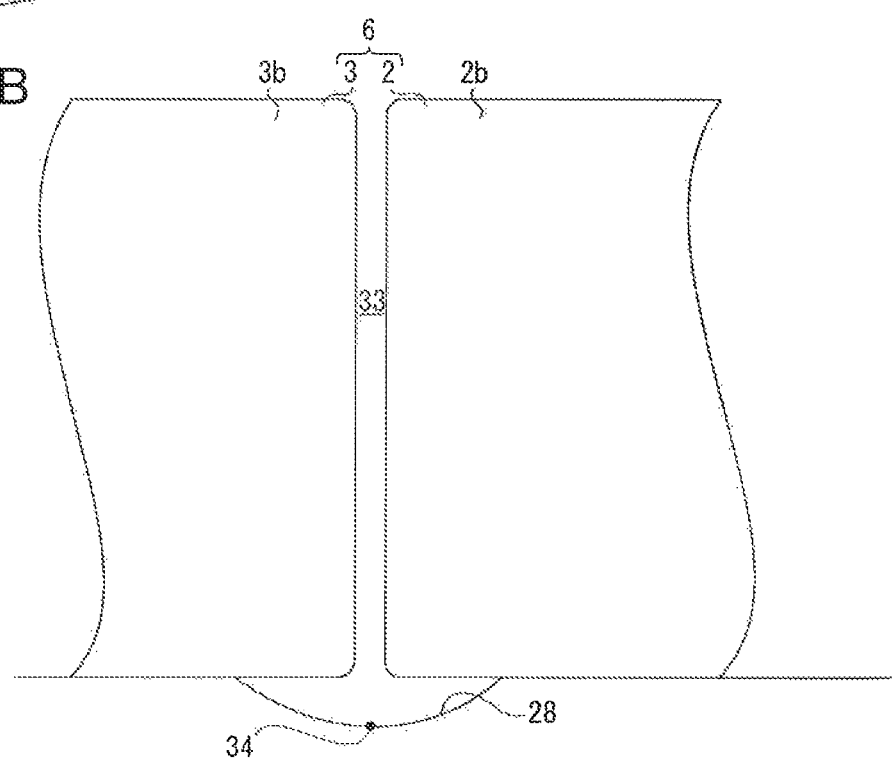

FIG. 10A and FIG. 10B illustrate enlarged views of the outer circumferential notch 28 that is in communication with the pump chamber 7A.

FIG. 10A is an enlarged perspective view of one of the internal teeth 2b of the outer rotor 2 and one of the external teeth 3b of the inner rotor 3 that form the pump chamber 7A and that are located above the outer circumferential notch 28 (that is, ones located on the front side of the pump chamber 7A in the direction of movement).

The pump chamber 7A is formed as a space substantially sealed by, for instance, a corresponding one of the internal teeth 2b and a corresponding one of the external teeth 3b. As illustrated by a one-dot chain line in FIG. 10A, small spaces 33 are formed between the internal teeth 2b and the external teeth 3b. That is, a small amount of the fluid in the pump chamber 7A leaks into the adjacent pump chambers 7 via the corresponding spaces 33 when the pressure of the pump chamber 7A is larger than the pressure of each adjacent pump chamber 7.

FIG. 10B illustrates one of the spaces 33 viewed from the lateral direction. The space 33 is formed between the corresponding one of the internal teeth 2b and the corresponding one of the external teeth 3b at a location at which the internal tooth and the external tooth are closest to each other. There is a possibility that the width of the space 33 changes depending on the position of the pump chamber 7A.

When the pump chamber 7A is in communication with the first discharge port 18 via the outer circumferential notch 28 as illustrated, the pressure of the inside of the pump chamber 7A is high, and the fluid in the pump chamber 7A passes through the outer circumferential notch 28 and is discharged via the first discharge port 18. At this time, the amount of the fluid that passes through the space 33 and moves to the first discharge port 18 is increased under the influence of the flow of the fluid in the outer circumferential notch 26.

The center of the outer circumferential notch 28 in the width direction preferably coincides with the center of the space 33 when viewed from above so that the amount of the fluid that passes through the space 33 and moves to the first discharge port 18 is increased. That is, a projected point (a chip point 34, see FIG. 10E) of the center of the space 33 on the upstream land surface 30 preferably coincides with the center of the other circumferential notch 28 in the width direction.

Accordingly, the outer circumferential notch 28 is preferably formed along a chip point trajectory 35 obtained by linking each chip point 34 in the course of movement of the pump chamber 7A.

The specifics will be described with reference to FIG. 11.

Figure 11:
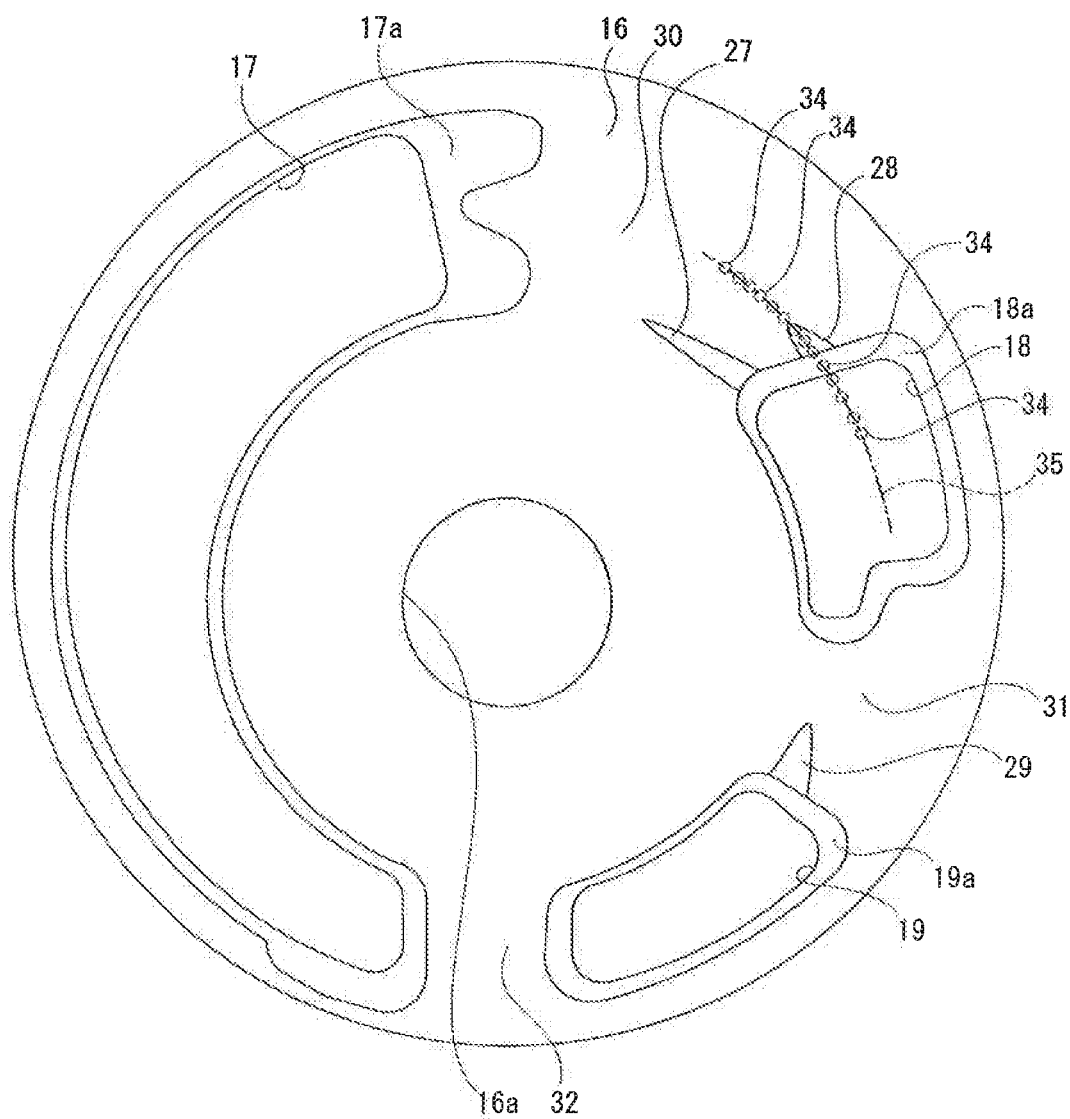
FIG. 11 illustrates the relationship between a chip point trajectory and the outer circumferential notch.

FIG. 11 illustrates some chip points 34 between the corresponding one of the internal teeth 2b and the corresponding one of the external teeth 3b at certain positions in the pump chamber 7A. The chip point trajectory 35 obtained by linking each chip point 34 is illustrated by a one-dot chain line.

As illustrated, a part of the chip point trajectory 35 substantially coincides with a curve drawn on the center of the outer circumferential notch 28 in the width direction. That is, the fluid is likely to pass through the spaces 33 between the internal teeth 2b and the external teeth 3b under the influence of the fluid passing through the outer circumferential notch 28.

Thus, discharge of the fluid from the pump chamber 7A can be started by using the corresponding spaces 33 and the outer circumferential notch 28 before the pump chamber 7A is in direct communication with the first discharge port 18, and a discharge pressure when the pump chamber 7A is in direct communication with the first discharge port 18 can be inhibited from excessively increasing. Accordingly, a sound of the passing fluid that is made when the fluid is discharged via the first discharge port 18 can be reduced, and the components can be inhibited from eroding due to a variation in pressure.

The length of the outer circumferential notch 28 will now be described with reference to the drawings. The pump chamber adjacent to the pump chamber 7A on the front side in the direction of movement is referred to as a pump chamber 7B, and another pump chamber adjacent to the pump chamber 7B is referred to as a pump chamber 7C.

FIG. 8 illustrates a state before the pump chamber 7A and the outer circumferential notch 28 are communicated with each other. In this state, the first discharge port 18 and the second discharge port 19 are in communication with each other via the pump chamber 7C.

FIG. 9 illustrates a state where the pump chamber 7A and the outer circumferential notch 28 are in direct communication with each other. In this state, the direct communication between the pump chamber 7C and the first discharge port 18 has broken. That is, a large amount of the fluid in the pump chamber 7A having a high pressure is not discharged via the second discharge port 19 via the first discharge port 18 and the pump chamber 7C.

In other words, the length of the outer circumferential notch 28 is such that the first discharge port 18 is communicated with the pump chamber 7A right after the direct communication between the pump chamber 7C and the first discharge port 18 has broken.

The description now returns to the operation of the pump chamber 7A.

Figure 12:
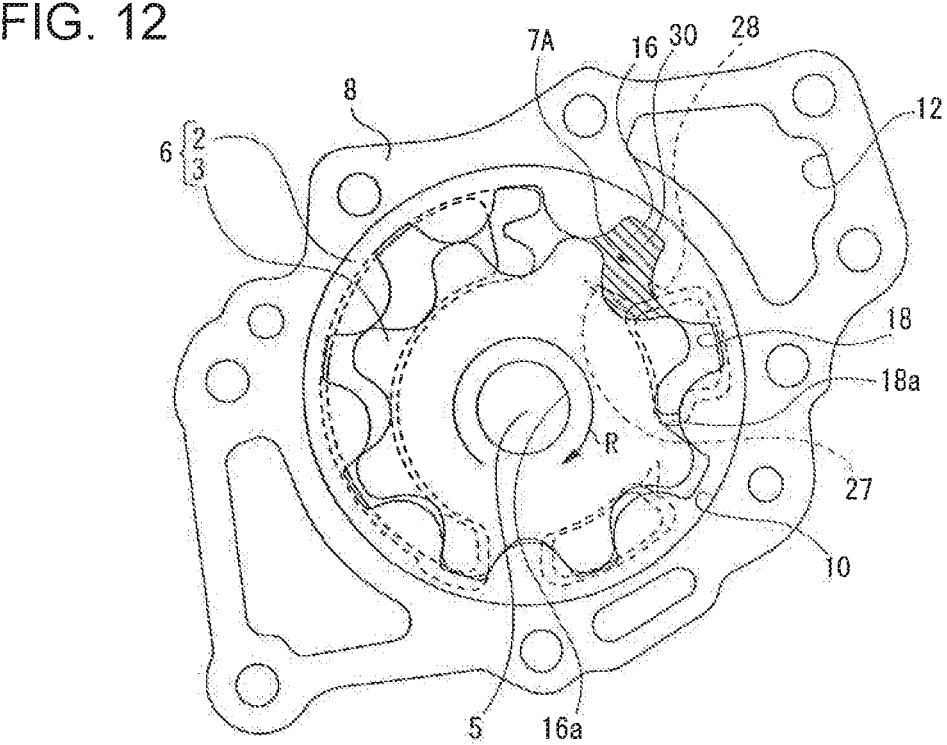
FIG. 12 is a plan view of the pump chamber to which attention is paid and illustrates the pump chamber that moves.

FIG. 12 illustrates a state where the pump shaft 5 rotates and the pump chamber 7A moves from the state illustrated in FIG. 9. As illustrated, the pump chamber 7A is in direct communication with the first discharge port 18. In this state, the fluid in the pump chamber 7A is discharged via the first discharge port 18, and the pressure of the pump chamber 7A decreases.

Figure 13:
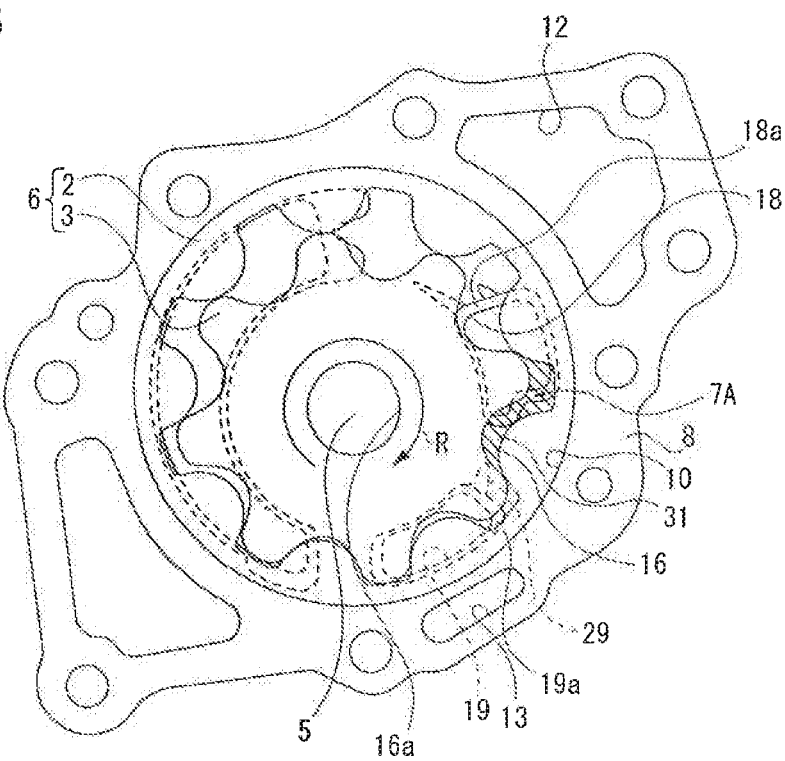
FIG. 13 is a plan view of the pump chamber to which attention is paid and illustrates the pump chamber that moves.

FIG. 13 illustrates a state where the pump shaft 5 further rotates.

As illustrated, the pump chamber 7A is located above the intermediate land surface 31, and the communication between the pump chamber 7A and the first discharge port 18 is about to break right before the pump chamber 7A is communicated with the third notch 29.

Figure 14:
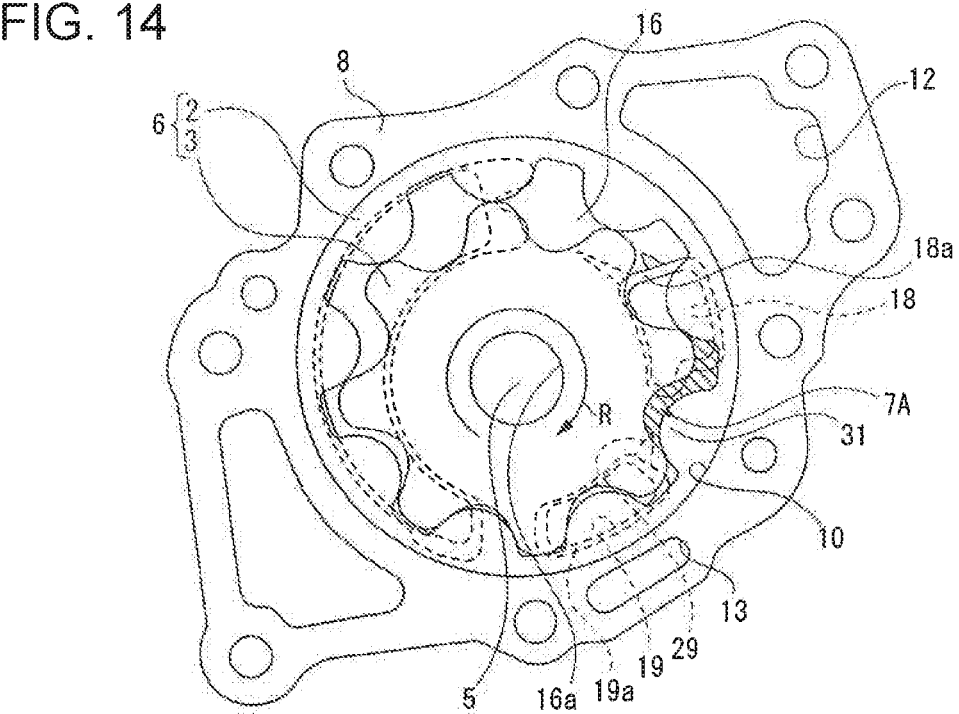
FIG. 14 is a plan view of the pump chamber to which attention is paid and illustrates the pump chamber that moves.

FIG. 14 illustrates a state where the pump chamber 7A moves, and the pump chamber 7A and the third notch 29 are in communication with each other. The fluid in the pump chamber 7A is discharged via the first discharge port 18, also passes through the third notch 29, and is discharged via the second discharge port 19. Thus, the pressure of the inside of the pump chamber 7A is inhibited from excessively increasing.

Figure 15:
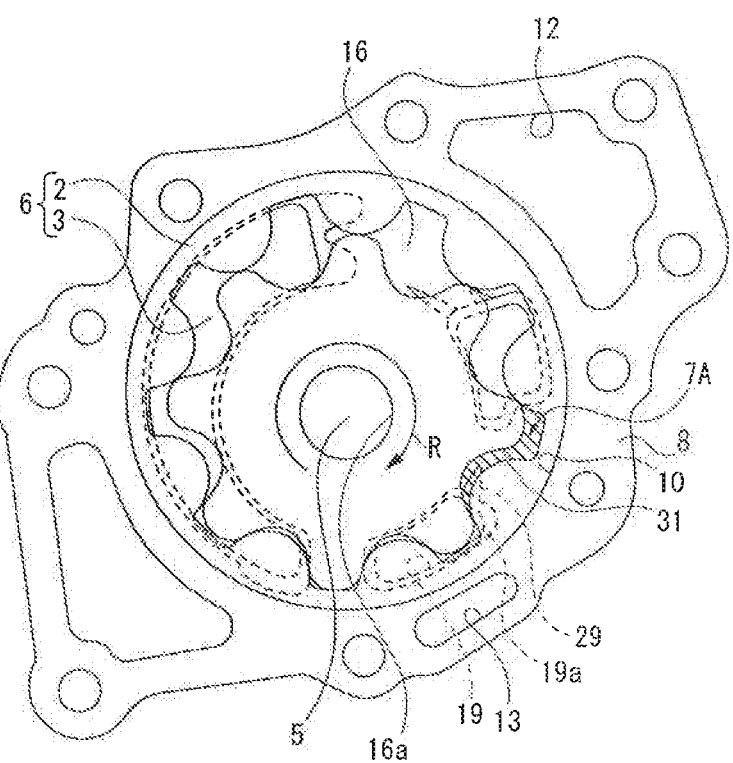
FIG. 15 is a plan view of the pump chamber to which attention is paid and illustrates the pump chamber that moves.

FIG. 15 illustrates a state where the pump shaft 5 rotates, and the pump chamber 7A is in direct communication with the second discharge port 19. In this state, the direct communication between the pump chamber 7A and the first discharge port 13 has broken, and the fluid in the pump chamber 7A discharged mainly from the second discharge port 19.

At this time, the fluid in the pump chamber 7A has passed through the third notch 29 and has been discharged via the second discharge port 19. For this reason, in the state illustrated in FIG. 15, a sound of the passing fluid that is discharged from the pump chamber 7A via the second discharge port 19 is reduced.

3. Summary

As described above, the internal gear pump 1 according to the example includes the outer rotor 2 that has the internal teeth 2b, the inner rotor 3 that is rotatably disposed inside the outer rotor 2, that forms the pump chambers 7 (7A, 7B, and 7C) configured to expand and contract repeatedly between the outer rotor 2 and the inner rotor 3, and that has the external teeth 3b the number of which is one less than the number of the internal teeth 2b, the external teeth 3b being engaged with the internal teeth 2b, and the pump housing 4 that is formed of the case 8 having the retention hollow 10 in which the outer rotor 2 is rotatably retained and the cover 9 that blocks the opening of the retention hollow 10 and that has the inhalation port 17 via which the fluid is to be inhaled into the pump chambers 7 and the discharge ports (the first discharge port 18 and the second discharge port 19) via which the fluid is to be discharged from the pump chambers 7. The pump housing 4 has the first notch (the outer circumferential notch 28) formed within the first land surface (the upstream land surface 30) that extends from an end of the inhalation port 17 to an end of the discharge port (the first discharge port 18). The internal teeth 2b and the external teeth 3b are in sliding contact with the first land surface. The first notch (the outer circumferential notch 28) is formed along the projection trajectory (she chip point trajectory 35) obtained by projecting the trajectory of the chip points 34 on the first land surface (the upstream land surface 30), where each chip point 34 is a middle point (the center of the corresponding space 33) between the corresponding one of the internal teeth 2b and the corresponding one of the external teeth 3b at a location at which the internal tooth and the external tooth substantially face each other above the first land surface (the upstream land surface 30) and are closest to each other.

Thus, the outer circumferential notch 28, which corresponds to the first notch, is located near a corresponding one of the spaces 33 formed between the internal teeth 2b and the external teeth 3b.

Accordingly, when one of the pump chambers 7 is in communication with the first notch (the outer circumferential notch 28), the fluid leaks from the pump chamber 7 into the discharge port (the first discharge port 18) via the corresponding one of the spaces 33 formed between the internal teeth 2b and the external teeth 3b and the first notch (the outer circumferential notch 28).

At this time, the fluid in the corresponding one of the spaces 33 formed between the internal teeth 2b and the external teeth 3b, particularly, a part of the fluid that is near the first notch (the outer circumferential notch 28) and on the lower side moves to the discharge port (the first discharge port 18) so as to follow the flow of the fluid leaking from the first notch (the outer circumferential notch 28). Accordingly, the fluid in the pump chamber 7 is discharged via the discharge port (the first discharge port 18) before the pump chamber 7 is directly communicated with the discharge port (the first discharge port 18) without interposing, for instance, the first notch (the outer circumferential notch 28), and the pressure of the pump chamber 7 can be decreased. That is, the pressure of the pump chamber 7 can be inhibited from excessively increasing. Thus, the discharge pressure at the moment of the communication between the pump chamber 7 and the discharge port (the first discharge port 18) can be decreased. Consequently, the fluid is inhibited from spouting at an excessive flow rate from the pump chamber 7 into the discharge circuit (such as the first case discharge circuit 12) via the discharge port (the first discharge port 18), and the components forming the discharge port (the first discharge port 18) and the discharge circuit (such as the first case discharge circuit 12) can be inhibited from eroding.

In particular, in the case where the first notch (the outer circumferential notch 28) and the second notch (the inner circumferential notch 27) are formed within the first land surface (the upstream land surface 30), an increase in the rotational speed of the rotor unit 6 (for instance, a rotational speed of 2500 revolutions per minute or more of the rotor unit 6) increases the possibility that each pump chamber 7 and the discharge port (the first discharge port 18) are directly communicated with each other before the fluid leaks from the second notch (the inner circumferential notch 27) into the discharge port (the first discharge port 18). This makes it unable to sufficiently fulfill the function of the second notch (the inner circumferential notch 27) that decreases the pressure of the pump chamber 7, and the fluid having a high pressure of the pump chamber 7 is discharged via the discharge port (the first discharge port 18) when the pump chamber 7 and the discharge port (the first discharge port 18) are directly communicated with each other. Accordingly, a sound of the passing fluid and a vibration are made, and the components erode.

With the structure according to the example, however, the first notch (the outer circumferential notch 28) is formed along the chip point trajectory 35, and before each pump chamber 7 and the discharge port (the first discharge port 18) are directly communicated with each other, the fluid in the pump chamber 7 is efficiently discharged. This decreases the discharge pressure when the pump chamber 7 and the discharge port (the first discharge port 18) are directly communicated with each other and the fluid is discharged. Consequently, a sound of the passing fluid and a vibration are inhibited from being made, and the components are prevented from being broken due to erosion.

Figure 16:
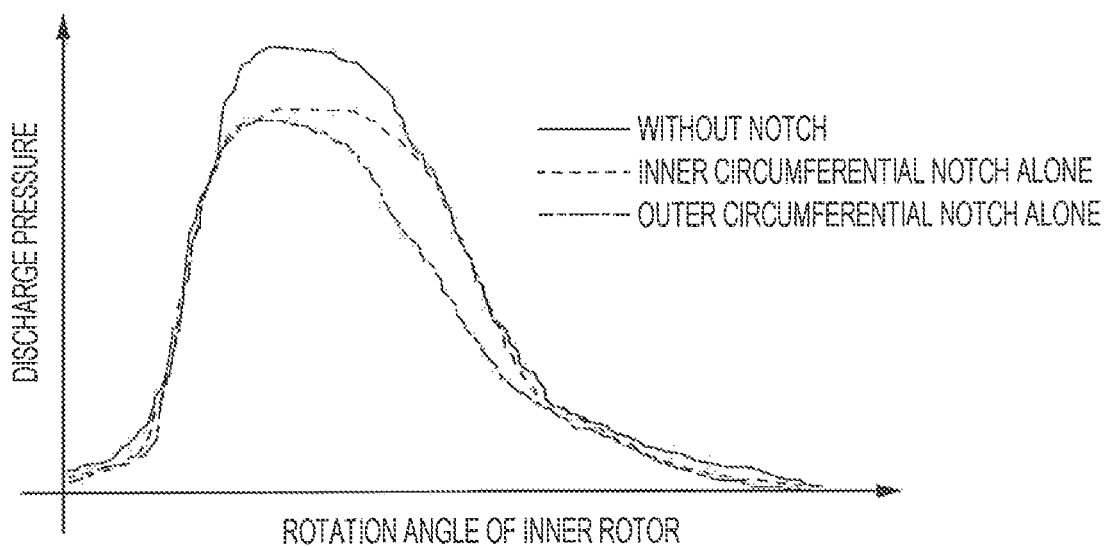
FIG. 16 illustrates the effects of an inner circumferential notch and the outer circumferential notch.

The specifics will be described with reference to FIG. 16. FIG. 16 is a graph illustrating a variation in the discharge pressure of the fluid that is discharged via the first discharge port 18 versus the rotation angle of the inner rotor 3.

In the graph, a variation in the discharge pressure in the case without the inner circumferential notch 27 and the outer circumferential notch 28 is illustrated by a solid line, a variation in the discharge pressure in the case of forming the inner circumferential notch 27 alone is illustrated by a dashed line, and a variation in the discharge pressure in the case of forming the outer circumferential notch 28 alone is illustrated by a one-dot chain line.

As illustrated, the peak value of the discharge pressure can be decreased in a manner in which the inner circumferential notch 27 or the outer circumferential notch 28 is formed. Consequently, a sound of the passing fluid and a vibration are inhibited from being made, and the components are prevented from being broken due to erosion.

It is illustrated that a variation in decrease in the discharge pressure in the case of forming the outer circumferential notch 28 alone is smaller than that in the case of forming the inner circumferential notch 27 alone. The smaller variation in the discharge pressure enables a vibration to be inhibited from being made and enables the occurrence of a noise to be reduced.

That is, the fluid in the pump chamber 7 above the notch that is not located along the chip point trajectory 35, such as the inner circumferential notch 27, passes along a side of the inner rotor 3 (along the lower surface of the inner rotor 3 in the drawings) and enters the notch. Accordingly, the amount of the passing fluid is low, and there is a risk that the pressure of the pump chamber 7 cannot be efficiently decreased. However, when the center line of the notch, such as the outer circumferential notch 28, substantially coincides with the chip point trajectory 35, the fluid enters the notch from not only the side of the inner rotor 3 but also a chip space (the space 33), and the pressure of the pump chamber 7 can be efficiently decreased.

As illustrated in the drawings, the pump housing 4 may have the first land surface (the upstream land surface 30), the first discharge port 18, the second land surface (the intermediate land surface 31), and the second discharge port 19 that are formed in this order in the rotation direction of the inner rotor 3.

Thus, the first discharge circuit (such as the first case discharge circuit 12) that is led from the first discharge port 18 and the second discharge circuit (the second case discharge circuit 13) that is led from the second discharge port 19 are formed.

Accordingly, the amount of the fluid that passes through the first discharge circuit and the second discharge circuit can be ensured in a manner in which a control valve is adjusted to merge the first discharge circuit and the second discharge circuit into each other, for instance, unless the fluid spreads throughout each target component, to which the fluid is to be supplied. The adjustment of the control valve also enables the first discharge circuit and the second discharge circuit to be separated from each other, for instance, while the fluid spreads throughout each target component, or while a vehicle stably travels. Thus, one of the discharge circuits can be communicated with a circuit that does not need to have a high pressure, and the other discharge circuit can be communicated with a circuit that needs to have a high pressure. The torques required for rotating the inner rotor 3 and the outer rotor 2 can be decreased in a manner in which one of the discharge port is communicated with a low-pressure circuit, and consequently, the pumping loss can be improved.

The first notch (the outer circumferential notch 28) may be formed such that the pump chamber 7 located above the first land surface (the upstream land surface 30) is not in communication with the first notch (the outer circumferential notch 28) when the pump chamber 7 located above the second land surface (the intermediate land surface 31) is in communication with the first discharge port 18 and the second discharge port 19, as described with reference to, for instance, FIG. 8 and FIG. 9.

Thus, the pump chamber 7 located above the first land surface (the upstream land surface 30) is not communicated with the second discharge port 19 via the first notch (the outer circumferential notch 28), the first discharge port 18, and the pump chamber 7 located above the second land surface (the intermediate land surface 31).

Accordingly, the fluid is discharged from each pump chamber 7 via the first discharge port 18 at a relatively high pressure, but the pressure is not transmitted to the second discharge port 19. This enables the pressure of the second discharge circuit to be prevented from increasing particularly when the first discharge circuit (such as the first case discharge circuit 12) and the second discharge circuit (such as the second case discharge circuit 13) are separated from each other and the pressure of the second discharge circuit is low. That is, the pumping loss can be prevented from increasing. In addition, a noise and a vibration can be inhibited from being made when the fluid that is discharged via the second discharge port 19 passes through the second discharge circuit.

As illustrated in the drawings, the second notch (the inner circumferential notch 27) may be formed within the first land surface (the upstream land surface 30).

This allows the fluid to pass through the second notch (the inner circumferential notch 27) and allows to be discharged from each pump chamber 7 via the first discharge port 18 before the pump chamber 7 and the first discharge port 18 are directly communicated with each other. Accordingly, the pressure of the pump chamber 7 can be more effectively decreased.

As illustrated in the drawings, the second notch (the inner circumferential notch 27) may be formed nearer than the first notch (the outer circumferential notch 28) to the inner circumference of the inner rotor 3.

The second notch is formed to prevent the pressure of the pump chamber 7 located above the first land surface (the upstream land surface 30) from unnecessarily increasing. It is preferable that the pressure of the fluid that passes through the second notch and that is discharged via the discharge port (the first discharge port 18) do not increase more than necessary. With the structure according to the example, the second notch is formed nearer than the first notch to the inner circumference. The flow rate of the fluid in each pump chamber 7 at a location nearer to the inner circumference of the inner rotor 3 is lower than that at a location nearer to the outer circumference. For this reason, the flow rate of the fluid that passes through the second notch and that is discharged via the discharge port is lower than that in the case where the second notch is formed on the outer circumferential side. Thus, the pressure and the flow rate of the fluid that passes through the second notch and that is discharged do not increase more than necessary, and a noise and a vibration due to the fluid can be inhibited from increasing.

Needless to say, the second notch can be formed nearer than the first notch to the outer circumference. This enables the pressure of each pump chamber 7 to be inhibited from increasing.

The internal gear pump 1 may be used as a discharge source of a fluid to be supplied to a power transmission mechanism of a vehicle.

The first notch (the outer circumferential notch 28) is located near the corresponding one of the spaces 33 formed between the internal teeth 2b and the external teeth 3b as described above.

The fluid for used in the power transmission mechanism of the vehicle such as oil needs to be discharged at a relatively high pressure. There is a tendency that the fluid is used at a large number of revolutions. With the structure according to the example, even when the rotor unit 6 rotates at a large number of revolutions, the pressure of each pump chamber 7 can be inhibited from excessively increasing, and the discharge pressure at the moment of the communication between one of the pump chambers 7 and the discharge port (the first discharge port 18) can be decreased in a manner in which oil passes through the first notch and is discharged in advance, which is preferable.

According to the present invention, the difference in pressure between the discharge port and the corresponding pump chamber can be decreased even when the inner rotor and the outer rotor rotate at a high speed.

The invention claimed is:

1. An internal gear pump comprising:
   an outer rotor that comprises internal teeth;
   an inner rotor that is rotatably disposed inside the outer rotor, that forms pump chambers configured to expand and contract repeatedly between the outer rotor and the inner rotor, and that comprises external teeth a number of which is one less than a number of the internal teeth, the external teeth being engageable with the internal teeth; and
   a pump housing that is formed of a case comprising a retention hollow in which the outer rotor is rotatably retained and a cover that blocks an opening of the retention hollow and that has an inhalation port via which a fluid is to be inhaled into the pump chambers and a first discharge port via which the fluid is to be discharged from the pump chambers,
   wherein the pump housing has a first notch formed within a first land surface that extends from an end of the inhalation port to an end of the first discharge port, and the internal teeth and the external teeth are in sliding contact with the first land surface,
   wherein the first notch is formed along a projection trajectory obtained by projecting a trajectory of chip points on the first land surface, where each of the chip points is a middle point between a corresponding one of the internal teeth and a corresponding one of the external teeth at a location at which the internal tooth and the external tooth substantially face each other above the first land surface and are closest to each other,
   wherein the pump housing comprises the first land surface, the first discharge port, a second land surface, and a second discharge port that are formed in this order in a rotation direction of the inner rotor, and
   wherein the first notch is formed in such a manner that one of the pump chambers located above the first land surface is not in communication with the first notch when another pump chamber located above the second land surface is in communication with the first discharge port and the second discharge port.

2. The internal gear pump according to claim 1, wherein a second notch is formed within the first land surface.

3. The internal gear pump according to claim 2, wherein the second notch is formed nearer than the first notch to an inner circumference of the inner rotor.

4. The internal gear pump according to claim 3, wherein the internal gear pump is used as a discharge source of a fluid to be supplied to a power transmission mechanism of a vehicle.

5. The internal gear pump according to claim 2, wherein the internal gear pump is used as a discharge source of a fluid to be supplied to a power transmission mechanism of a vehicle.

6. The internal gear pump according to claim 1, wherein the internal gear pump is used as a discharge source of a fluid to be supplied to a power transmission mechanism of a vehicle.

7. The internal gear pump according to claim 1 further comprising a second notch that is formed nearer than the first notch to an inner circumference of the inner rotor, and the second notch being longer in length than the first notch, and, like the first notch, the second notch having a downstream end that opens into the first discharge port.

8. The internal gear pump according to claim 7 wherein the pump housing comprises a third notch that is formed in the second land surface and has a downstream end that opens into the second discharge port.

* * * * *